(12) United States Patent
Müller et al.

(10) Patent No.: US 6,365,847 B1
(45) Date of Patent: Apr. 2, 2002

(54) WEIGHT SENSOR

(75) Inventors: Michael Müller, Göttingen; Ulrich Bajohr, Duderstadt; Rudolf Müller, Bovenden; Werner Schulze; Detlef Erben, both of Göttingen; Herbert Engelhardt, Moringen, all of (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 09/576,413

(22) Filed: May 22, 2000

(30) Foreign Application Priority Data

May 20, 1999 (DE) ......................................... 199 23 207

(51) Int. Cl.$^7$ ............................................. G01G 21/24
(52) U.S. Cl. .............................. 177/210 EM; 177/212
(58) Field of Search ........................... 17/210 EM, 212

(56) References Cited

U.S. PATENT DOCUMENTS

| | | | |
|---|---|---|---|
| 2,832,535 A | 4/1958 | Sherman | 235/61 |
| 4,148,370 A * | 4/1979 | Lüchinger et al. | 177/210 EM |
| 4,184,556 A * | 1/1980 | Kunz | 177/210 EM |
| 4,799,561 A * | 1/1989 | Komoto | 177/229 |
| 4,813,505 A * | 3/1989 | Södler et al. | 177/212 |
| 4,932,487 A | 6/1990 | Melcher et al. | 177/50 |
| 5,866,854 A | 2/1999 | Emery et al. | 177/50 |
| 6,232,567 B1 * | 5/2001 | Bonino et al. | 177/210 EM |

FOREIGN PATENT DOCUMENTS

| | | |
|---|---|---|
| DE | 195 40 782 C1 | 12/1996 |
| DE | 196 05 087 C2 | 8/1997 |
| EP | 0 518 202 A1 | 12/1992 |

* cited by examiner

Primary Examiner—Randy W. Gibson
(74) Attorney, Agent, or Firm—Sughrue Mion, PLLC

(57) ABSTRACT

In a weight sensor operating according to the principle of electromagnetic force compensation, the essential parts are fabricated from a single block of material. The weight sensor has a load receiver (10), which is connected through an upper guide (12) and a lower (11) guide to the housing-integral base body (1) of the material block. The weight sensor also has several force-reduction translating levers (21,22; 24, 25,25'; 27,27',28) and coupling elements (18,18', 23, 26,26') between the translating levers (21, 22; 24 ,25,25'; 27,27',28). The housing-integral base body (1) projects in the direction of the load receiver (10), extends into the space between the two guides (11, 12) and forms a support point for the first translating lever (21, 22). The weight sensor is equipped with a coil (34), which is fastened at the longer lever arm (28) of the last translating lever (27,27',28,29,29') and is situated in the magnetic field of a permanent magnet. To reduce the overall height and to receive higher loads, at least one translating lever is at least partially split into two partial levers (25, 25'; 27,27'; 29,29'). At least one coupling element is split into two partial coupling elements (26,26'; 38,38'). The partial levers and the partial coupling elements are arranged symmetrically on both sides of the projecting part (3) of the base body (1).

31 Claims, 9 Drawing Sheets

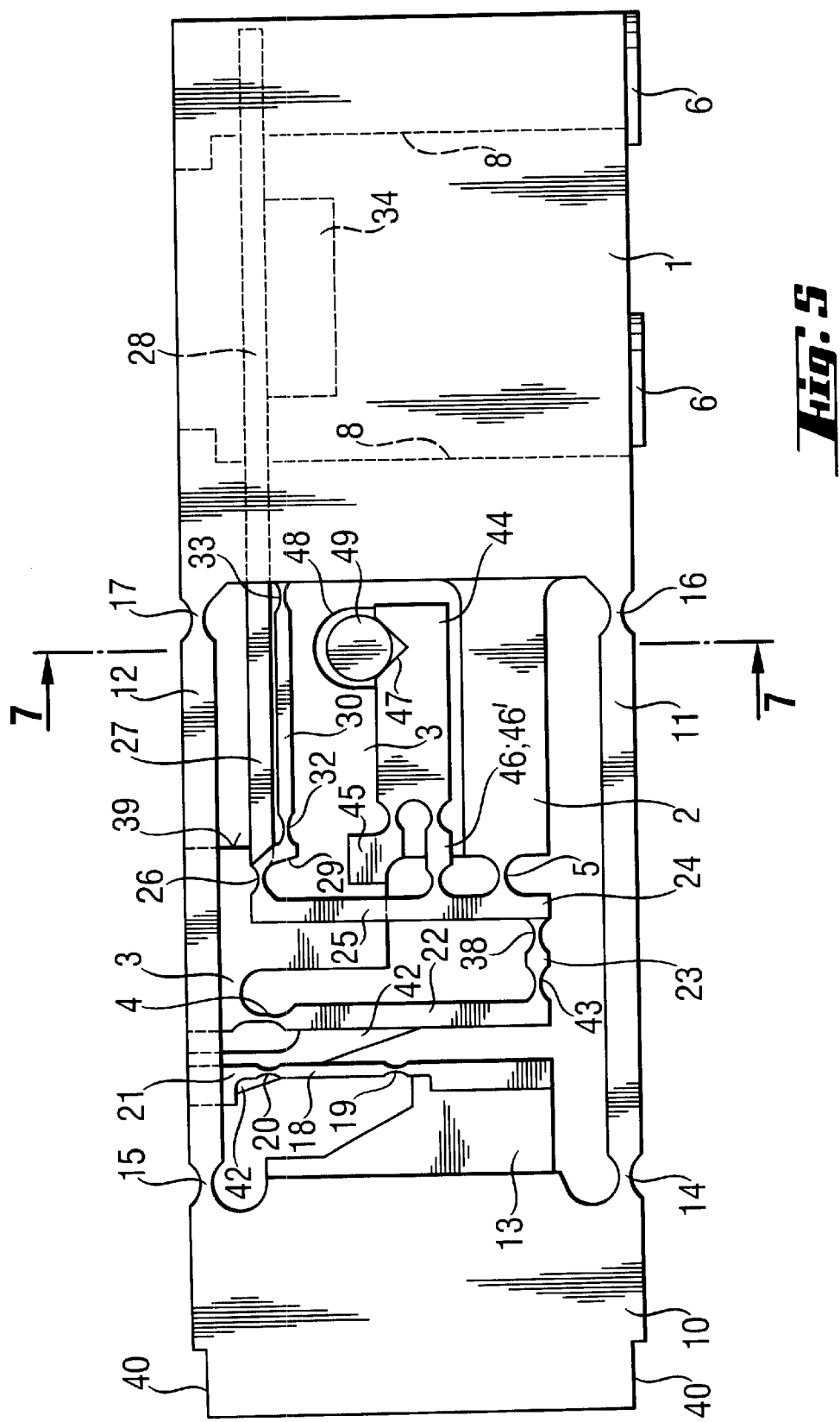

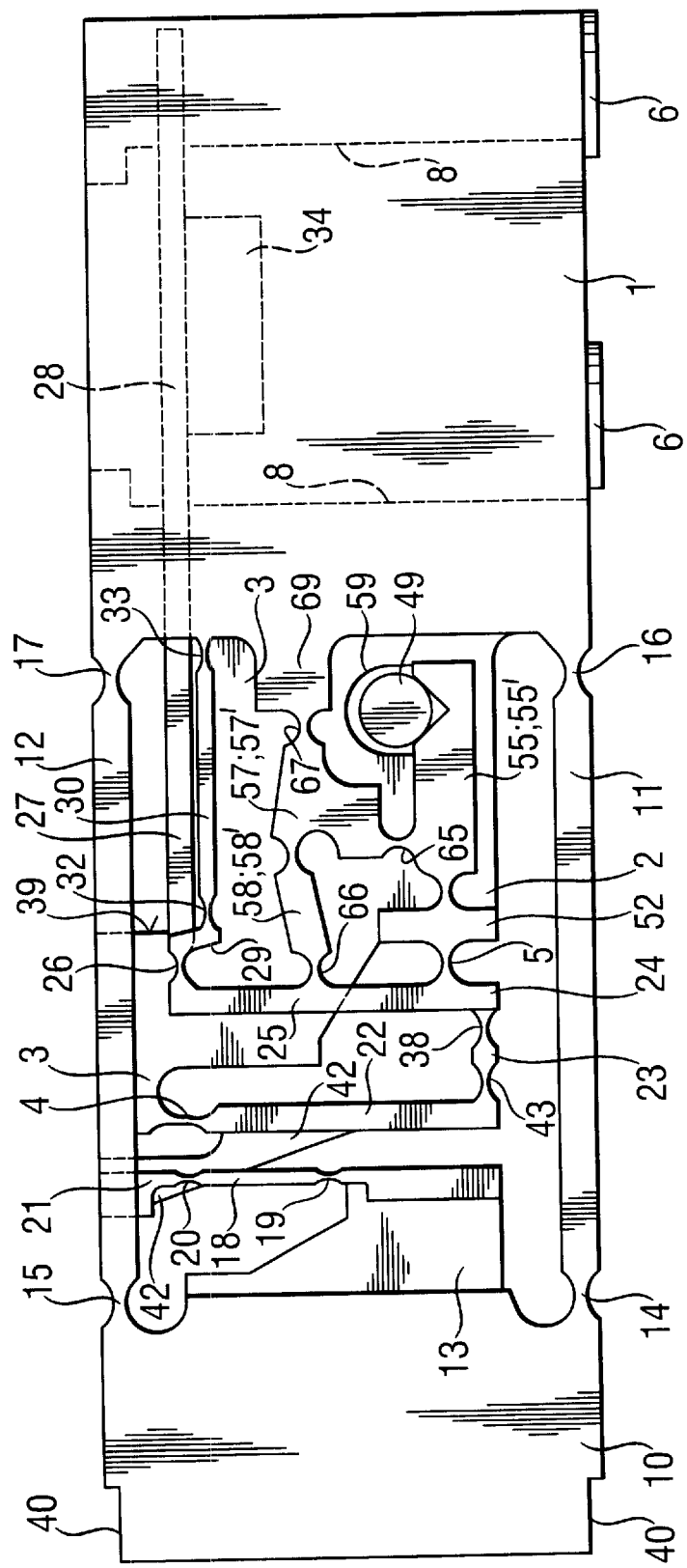

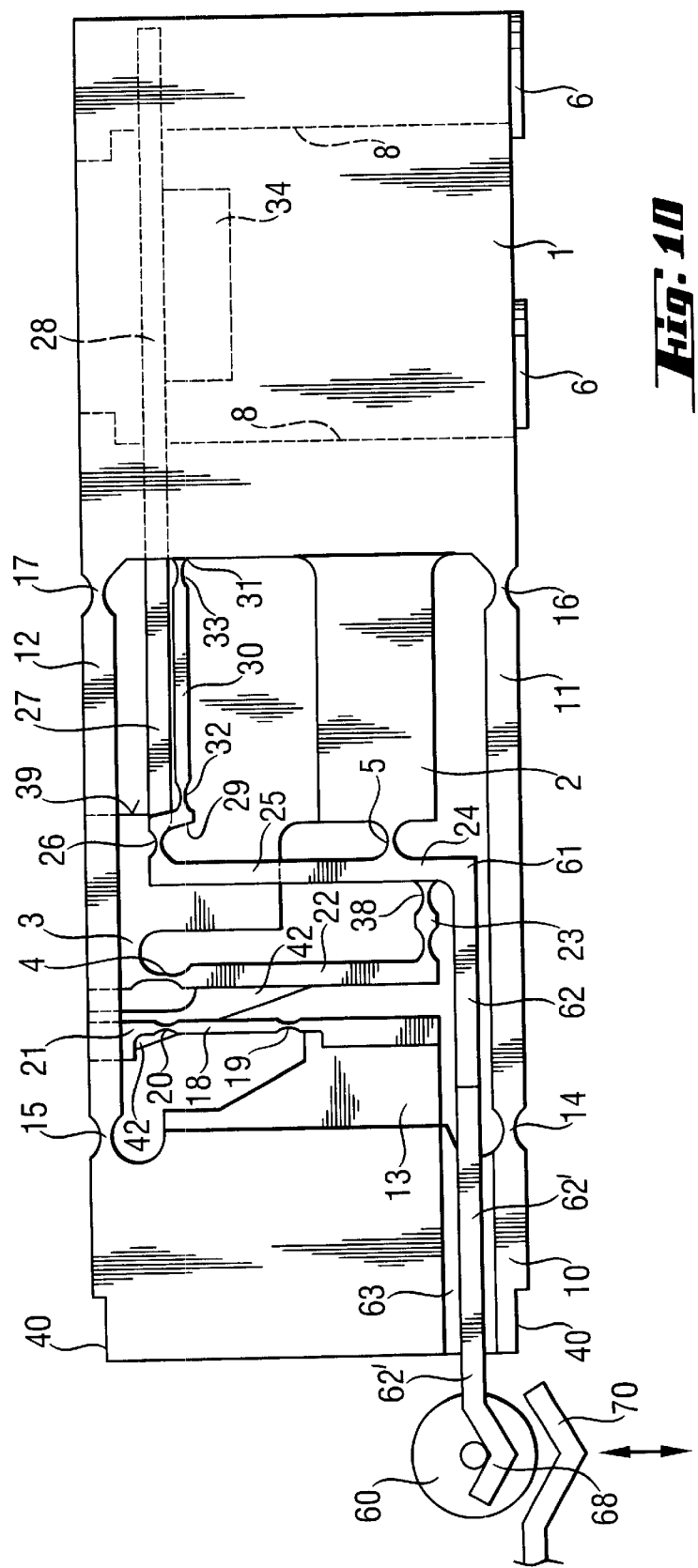

WEIGHT SENSOR

The following disclosure is based on German Patent Application No. 19923207.5, filed on May 20, 1999, which is incorporated into this application by reference.

FIELD OF AND BACKGROUND OF THE INVENTION

The invention relates to new and useful improvements in a weight sensor. The weight sensor, which operates according to the principle of electromagnetic force compensation, and the essential parts of which are produced from a single block of material, has a vertically movable load receiver. The load receiver is guided in parallel guide elements, which are articulated to a fixed base body of the block of material. The load receiver is effectively coupled to several force-translating elements which are serially arranged between the load receiver, a coil carrier, and the base body.

Weight sensors of this type are known, for example, from European Patent Application EP 518 202 A1. A drawback of this known construction is that there is no space left within the one-piece block for the permanent magnet. In European Patent Application EP 518 202 A1, the permanent magnet is therefore mounted outside of the one-piece block and the last translation lever of several translation levers is extended by lateral extension pieces which bear the coil. However, as a result, the functional and price advantages of the single-piece construction are partially lost. In addition, the arrangement of all three translation levers one above the other requires a large overall height. All parallel guide elements and force translating elements are dimensioned in accordance with the width of the block and sequentially arranged one above and behind the other. As a result, the structural shape is relatively high and narrow.

A similar weight sensor with two translation levers is known from German Patent Application DE 195 40 782 A1. It is difficult, however, to obtain a large force translation ratio with two translation levers, such as is required for particularly high-load scales having a maximum load of 30 to 150 kg. Also, in the design of German Patent Application DE 195 40 782 A1, there is no room available for the installation of a third translation lever. In particular, it is problematical to fix the third translation lever to the housing.

Due to its monolithic construction, the weight sensor according to German Patent Application DE 195 40 782 C1 has very good measuring properties and an outstanding long-term stability. Because of its two translation levers with their combined high translation ratio, this weight sensor is particularly suited for heavy loads above 10 kg.

The only drawback of this weight sensor is that its sensitivity can be checked and, if necessary, adjusted only through external application of calibrating weights. However, the handling of external calibrating weights $\geq 10$ kg is complicated and cumbersome.

It is therefore already known (for example from U.S. Pat. No. 2,832,535 and U.S. Pat. No. 4,932,487) to use internal calibrating weights in weight sensors composed of individual pieces, which calibrating weights are not applied directly to the load receiver but rather to one of the translating levers. As a result, the calibrating weight can remain much smaller than the maximum load of the balance and yet has the effect of a calibrating weight at maximum load due to the translating ratio. Applying this principle to a monolithic weight sensor of the type described above, however, is difficult since, as a result of the monolithic construction, space in the weight sensor is very restricted.

In a partially monolithic weight sensor, in which all but the last translating lever, all coupling elements, and the guides are fabricated from one block by means of thin cuts, it is further known from German Patent Application DE 196 05 087 C2 (corresponding to U.S. Pat. No. 5,866,854) to provide a coupling area for an internal calibrating weight, wherein the coupling area is parallel-guided by two additional guides. Two cross beams are attached to this coupling area as a support means for the calibrating weight. This additional parallel guide system, however, increases the overall height of the weight sensor and increases the number of spring joints by four additional joints. As a result, the spring constant of the weight sensor, and thus the likelihood of uncontrolled measured value changes, rises. Furthermore, as a result of the fastening of the cross beams to the monolithic part, material stresses are generated in this part and, therefore, the advantages of monolithic construction are again partially defeated.

OBJECTS OF THE INVENTION

Therefore, it is one object of the invention to further develop a compact construction for a weight sensor of the type mentioned above, in which all force translating elements are fabricated entirely from the block of material. It is a further object to provide a construction that does not require the initial height of the material block and the overall height of the finished weighing system to be large. The structural shape should also be suitable for coupling a calibration means in a simple manner to the force translating elements, if desired.

SUMMARY OF THE INVENTION

According to one formulation of the invention, the above and other objects are achieved by a weight sensor which includes a base body, a load receiver and a plurality of force transmission elements which are arranged between the base body and the load receiver. Furthermore, at least one of the plurality of force transmission elements is divided to form partial force transmission elements. These partial force transmission elements are symmetrically spaced from a central, vertical plane which passes through the load receiver. Moreover, at least one of the plurality of force transmission elements is arranged symmetrical in the central, vertical plane. The base body includes at least one projection that has bearing points to bear at least one of the plurality of force transmission elements.

In accordance with its broad and narrower formulations, the invention makes use of, with respect to force, symmetrical division or splitting of individual force translating elements. The projection of a base body advantageously projects relatively far in the direction of the load receiver. It is possible to use the projection's vertical and horizontal graduations or horizontal indentations as supports or receiving bearings for several force translating elements. As a result of this spatial division according to the invention and as a result of the three-dimensional subdivision of the translating elements, a geometry is created which facilitates a compact, low monolithic construction and, in particular, allows for fabrication by milling. This configuration also allows for optional coupling or at least partial integration of calibrating means into the monolithic block with all of the advantages regarding the physical behavior of the complex measuring unit.

More particularly, the above and other objects are achieved in that at least one translating lever is divided at least partially into two partial levers. Furthermore, at one coupling element is divided into two partial coupling elements and the partial levers and the partial coupling elements are symmetrically arranged on both sides of the projecting portion of the part that is fixed to the housing. All translating levers, all partial levers, all coupling elements, and all partial coupling elements are monolithic components of the block.

As a result of the division into partial levers and partial coupling elements, the partial levers and the partial coupling elements can be symmetrically arranged on both sides next to the centrally arranged, projecting portion of the part which is fixed to the housing. Thus, they can be fabricated from the block. In spite of this, a sufficiently stable projecting portion of the part which is fixed to the housing is maintained. Due to the symmetrical arrangement of the partial levers and the partial coupling elements, the symmetry of the force flux pattern is maintained so that the corner load sensitivity remains low. This spatial division according to the invention additionally allows one of the force translating elements to also serve as a direct support for a calibrating weight. Thereby, the calibrating weight can be disposed either inside or outside of the contour of the monolithic material block.

According to a first exemplary embodiment of the invention, a lever directly supporting a calibrating weight is a monolithic component of the material block. In a second embodiment, one of the translating levers has an additional lever arm to support the calibrating weight. This additional lever arm is a monolithic component of the material block as well.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

FIG. 5 shows a weight sensor with a calibration weight in side view in a first embodiment;

FIG. 6 shows a weight sensor with a calibration weight in side view in a second embodiment;

FIG. 10 shows a weight sensor with calibration weight in a fourth embodiment.

DETAILED DESCRIPTION OF THE PREFERRED EMBODIMENTS

Figure 1:
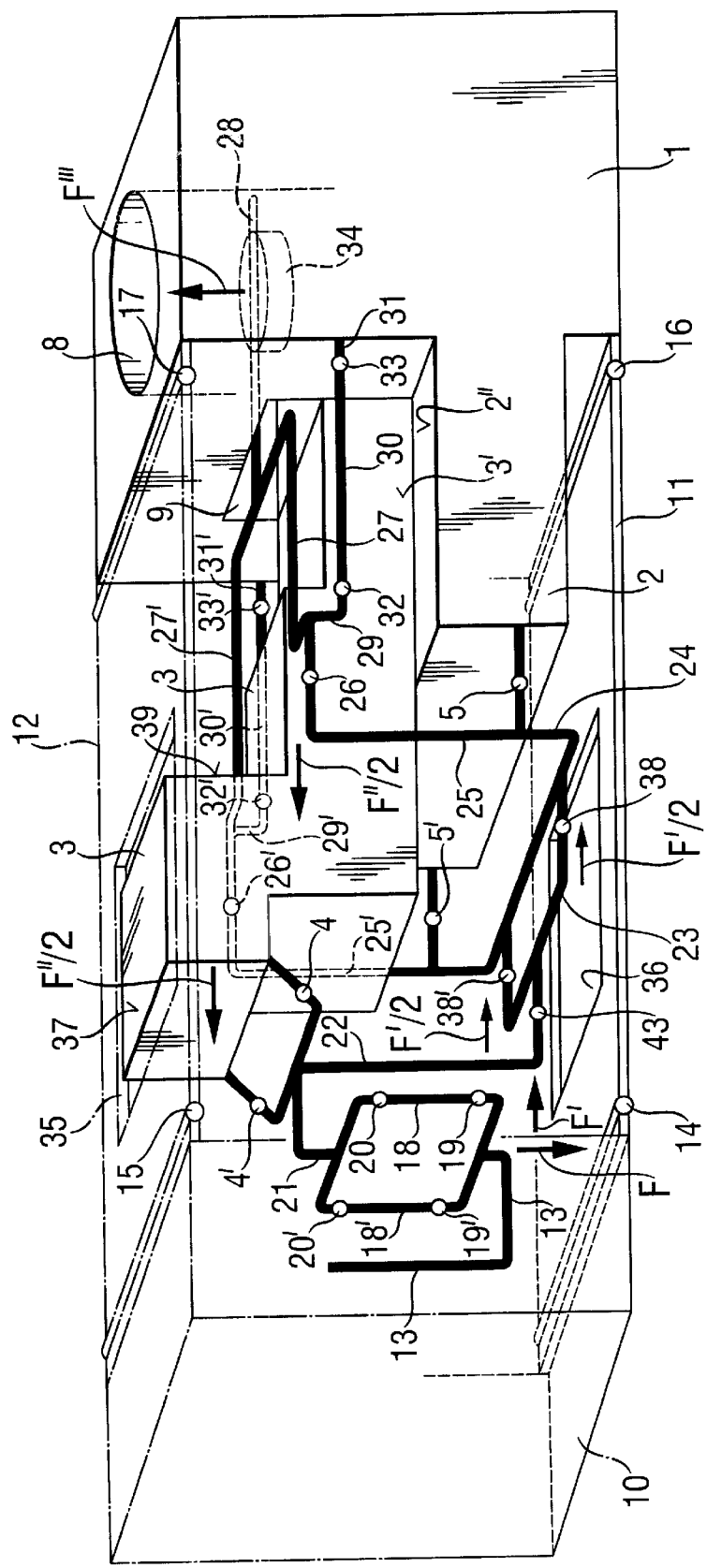
FIG. 1 shows schematically the arrangement of the levers and coupling elements and the bearing of the levers on the housing-integral base body.

The highly schematic FIG. 1 explains the arrangement and function of the system of levers, the bearing of the individual levers, and the arrangement of the coupling elements. The movable levers and coupling elements are drawn as bold lines. The joint points, which are formed through thin places in the material, are indicated with circles.

A homogenous block of metal, ceramic material, or plastic for the weight sensor has approximately the parallelepiped outline shape indicated between the reference numerals 1 and 10 in FIG. 1.

A housing-integral base body 1 is shown which has a projecting area (portion) 2 and 3. The area 2 has the full width of the base body 1, while the area 3 is narrower (approximately 40% of the base body 1). In the base body 1, there is a round hole 8, which receives a (not-depicted) cylindrical permanent magnet that can be inserted from below into the hole 8 and fastened onto integrated fastening tabs. The base body 1 also has a horizontally oriented, penetrating through-hole 9 with a rectangular cross section.

At the very left side of FIG. 1, a load receiver 10 is depicted which is connected to the base body 1 through an upper guide 12 and a lower guide 11. The articulation point or joint point between the upper guide 12 and the load receiver 10 is designated with the reference numeral 15. It extends across the entire width of the guide 12 and the load receiver 10. The articulation point between the lower guide 11 and the load receiver 10 is designated with the reference numeral 14. It extends across the entire width of the guide 11 and the load receiver 10. The articulation points between the guides 11 and 12 and the base body 1 are designated with the reference numerals 16 and 17, respectively. They also extend across the entire width. The upper guide 12 has a centrally situated recess (opening) 35 into which the projecting portion 3 projects. The upper terminating surface, as a graduation 37 of the projecting portion 3, is situated at the same height as the upper side of the guide 12. For reasons of symmetry, the lower guide 11 also has a central recess (opening) 36. In FIG. 1, the upper guide 12 and the upper portion of the load receiver 10 are drawn with broken lines. Thereby, the transparency of these areas is graphically suggested. Accordingly, the parts which are actually covered by the upper guide 12 and by the upper part of the load receiver 10 are therefore not dashed but rather are drawn with unbroken lines. The load receiver 10 is connected, through the guides 11 and 12 with their articulation points 14–17, to the base body 1. However, the load receiver can move somewhat in the vertical direction (less than 1 mm).

The force exerted on the load receiver 10 by the load to be measured is transferred from a projection 13 on the load receiver, via two coupling elements 18 and 18', to a first translating lever 21/22 (short lever arm 21, long lever arm 22). The vertical portion of the projection 13 on the left in FIG. 1 is identical with the right side surface of the load receiver 10. The two coupling elements 18 and 18' include articulation points 19/20 and 19'/20', respectively. The first translating lever 21/22 is borne by two bearing points 4 and 4' on the projecting area 3. By this means, a vertical force F is transformed into a reduced horizontal force F'. The force F' is transferred, via an articulation point 43, to a coupling element 23. There, the force F' is split into two force components F'/2 and transmitted, via articulation points 38 and 38', to a short lever arm 24 of a second translating lever. This second lever is borne by bearing points 5 and 5' at the projecting area 2. A long lever arm 25/25' of the second lever is split into two partial levers 25 and 25'. The partial lever 25 passes in front of the projecting area 3 and the other partial lever 25' passes behind the projecting area 3. Due to the translating lever 24/25/25', the horizontal force F' is converted into a reduced, likewise horizontal force F", whereby one half (F"/2) acts at the end of the front partial lever 25 and the other half acts at the end of the rear partial lever 25'. From there, the two forces are transferred, via coupling joints 26 and 26', to a third translating lever 29/29'/27/27'/28. The lever arm 29/29' is the short lever arm and the lever arm 27/27'/28 is the long lever arm. This third lever is borne via two support elements 30 and 30' at points 31 and 31' on the base body 1.

The articulation point between the support element 30 and the base body 1 is designated with the reference numeral 33 and the articulation point between the support element 30 and the shorter lever arm 29 of the third lever is designated with the reference numeral 32. Correspondingly, the articulation point between the support element 30' and the base body 1 is designated with the reference numeral 33' and the articulation point between the support element 30' and the shorter lever arm 29' of the third lever is designated with the reference numeral 32'. The part 28 of the longer lever arm 27/27'/28, which converges into a part that is not split, passes through the through-hole (hole) 9 of the base body 1 and supports in its rear area a coil 34 in the magnetic field of the permanent magnet. The coil 34 generates a vertical force F''', which is ultimately proportionate to the force F at the load receiver 10.

The aforementioned elements are, in the general sense, force transmitting elements, even if individual elements such as the elements 11,12 and 30,30' are essentially vertical guide elements or support elements, which protect the actual elements for force transmission from harmful lateral forces.

The individual parts of the force transmission system are either arranged centrally in the vertical plane of symmetry of the entire material block (for example, the first lever 21/22 or the non-split long lever arm 28 of the third lever) or are divided and arranged symmetrically with respect to the vertical plane of symmetry on both sides of the projecting part 3 (for example, the long lever arm 25/25' of the second lever or the lever arms 29/29' and 27/27' of the third lever). The divided areas each transmit one half of the force transmitted by the respective lever, coupling element, etc. The retainer of the round coil 34 is likewise a monolithic component of the lever arm 28 and is preferably adapted to the contour of the coil 34. All described parts, with the exception of the coil 34 and the not-depicted permanent magnet, are fabricated from a single block of material.

The individual coupled force transmission elements are arranged in one of two ways. Either, they are arranged in a vertically oriented central plane, or they are symmetrically spaced from this plane and divided geometrically and with respect to force. Thereby, the vertically oriented central plane passes through the non-split long lever arm 28 (also coil carrier) and the load receiver 10. The individual coupled force transmission elements, with the exception of the coil 34, are components of the material block. Thereby, the projecting part 2,3 of the base body 1 extends between the force transmission elements 11,12; 25,25'; 27, 27'; 29,29'; 30,30' which are divided geometrically and with respect to force. The projecting part 2,3 also forms abutments or bearing points 4,4'; 5,5' for a portion of the force transmission elements 22, 24. The arrangement of vertical and horizontal graduations (for example, 37,39; 2",3') in the projecting parts 2,3 creates additional open spaces permitting access for processing tools to fabricate the individual elements from the block of material. Additional graduations on the lower and upper side of the projecting parts 2,3 are shown in FIG. 1. However, these graduations do not have reference numerals.

Figure 2:
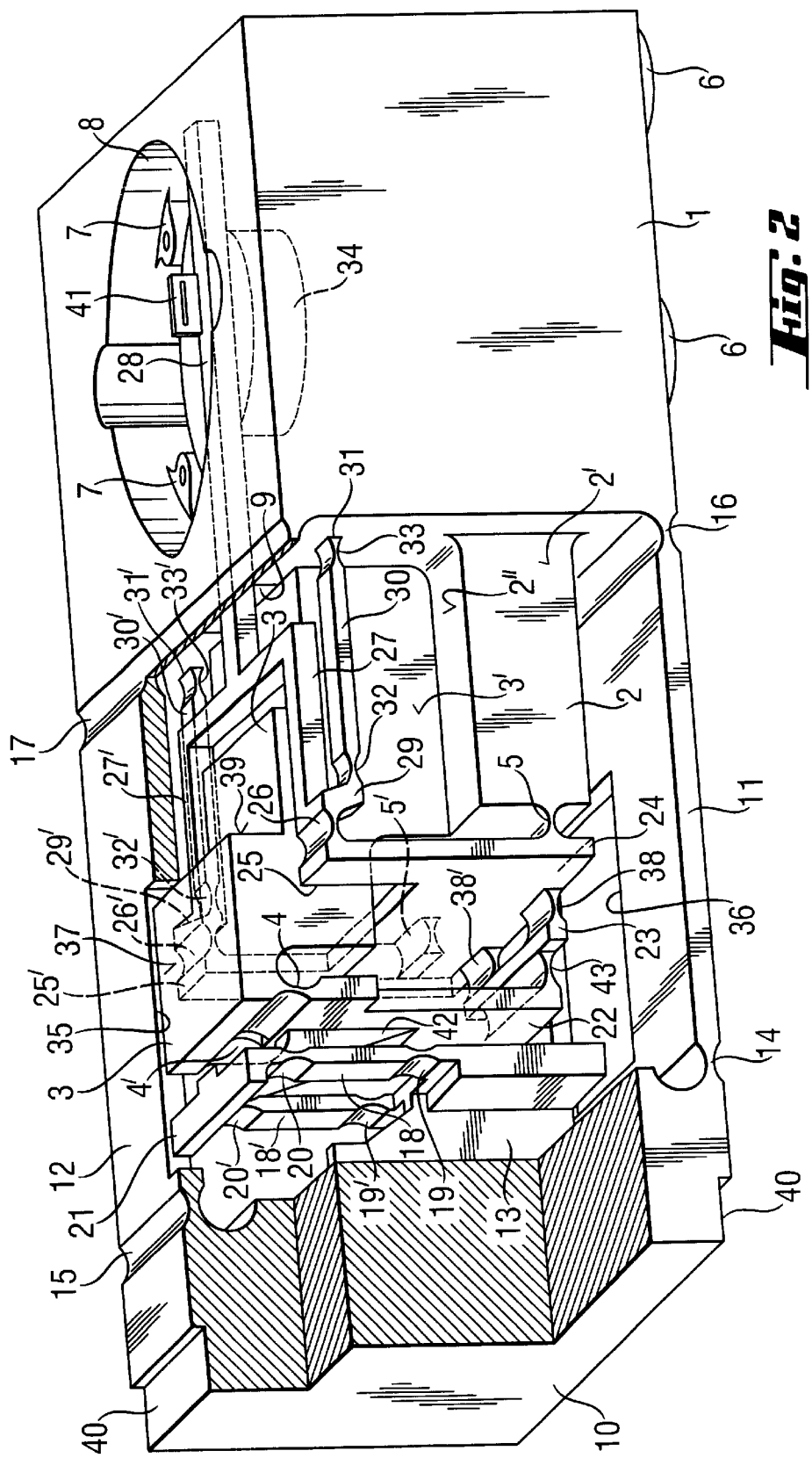
FIG. 2 shows a perspective view of the monolithic weight sensor in a first embodiment, with some parts being broken away.
Figure 3:
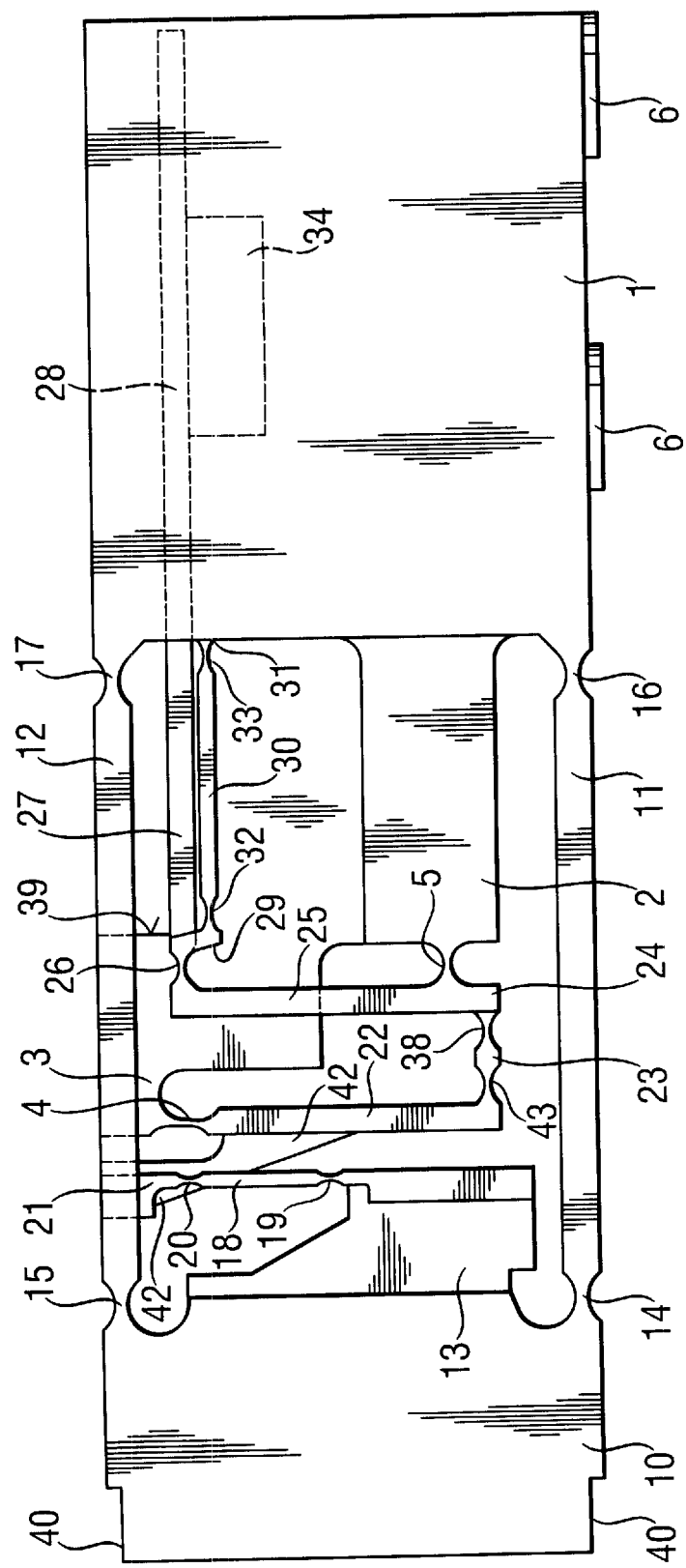
FIG. 3 shows a side view of the weight sensor of FIG. 2.

In FIG. 2, a first embodiment of a weight sensor according to the above construction principle is depicted. In FIG. 3, the same weight sensor is shown in side view. All levers, joints, and coupling elements are designated with the same reference numerals as in FIG. 1, even if they are depicted differently in FIG. 1 than in FIGS. 2 and 3.

FIGS. 2 and 3 show the housing-integral base body 1, which has flat pedestal areas 6 on its underside at which the base body can be fastened with screws to the housing of the balance. The integrated pedestal areas 6 can also be components of the housing, a mounting plate, or a chassis. The base body 1 extends to the left into the projecting part 2 and the projecting part 3 (vertical graduation). Since the upper terminating surface 37 of the projecting part 3 is situated at the same height as the upper side of the upper guide 12, the upper terminating surface 37 cannot be seen in the side view of FIG. 3. Only the vertical back side or graduation 39 of the projecting part 3 can be partially seen in FIG. 3.

In FIG. 2, the upper guide 12 is partially broken away to make the interior areas of the weight sensor visible. Likewise, a portion of the load receiver 10 is broken away. In contrast, the lower guide 11 is entirely depicted. Thin points in the material, which form the articulation points 14, 15, 16, and 17 in FIG. 1, can be seen across the entire width of the guide.

The force to be measured is transferred from the load receiver 10, via the stable projection 13 and the two coupling elements 18 and 18', to the short lever arm 21 of the first lever. The articulation points 19, 19', 20, and 20' are shown as thin points at the ends of the coupling elements 18 and 18'. Also visible is a triangular reinforcement 42 between the short lever arm 21 and the long lever arm 22 of the first lever. The first lever 21/22 is borne by the bearing points 4 and 4' on the projecting part 3.

From the end of the long lever arm 22, the reduced force is transferred, via an articulation point 43, to a coupling element 23 and from there, via two articulation points 38 and 38', to the short lever arm 24 of the second lever. The second translating lever 24/25/25' is borne by the bearing points 5 and 5' at the projecting part 2. In FIG. 2, the bearing point 5' is depicted in dashed lines since it is hidden behind the second translating lever 24/25/25'. In FIG. 3, the articulation point 5' is hidden behind the articulation point 5. The upper part of the long lever arm 25/25' is split in a fork-like manner. One part of the long lever arm 25 is situated on one side of the projecting part 3 (in FIG. 3 in front of the projecting part 3) and the other part of the long lever arm 25' is situated on the other side of the projection part 3 (in FIG. 3 behind the projecting part 3).

Accordingly, the two forces from the long lever arms 25 and 25' are transferred, via two partial coupling articulations 26 and 26', to the parts 29 and 29' of the split short lever arms of the third translating lever 29/29'/27/27'/28. The third lever is borne by the support elements 30 and 30' with the articulation points 32/32' and 33/33', respectively, at the base body 1. The long lever arm 27,27' of the third lever is split in its initial area and is brought back together at the end as the one part 28. The coil 34 is fastened to this common, non-split part 28 of the long lever arm. The two fork-like shafts or split parts 27 and 27' of the long lever arm of the third lever surround the projecting part 3 symmetrically. The support elements 30 and 30' for the third lever are again laterally situated on the outside of the two shafts 27 and 27'.

The width relationships can, by way of example, be as follows: The projecting part 3 has around 40% of the width of the base body 1, the lever arms 27 and 27' each have nearly 10% of the width of the base body 1, and the support elements 30 and 30', which are situated next to the lever arms 27 and 27', each have a width of nearly 10% of the width of the base body 1 as well. As a result of the spacing between the lever arm 27 and the support element 30, the partial coupling joint or thin point 26 and the short lever arm 29 have approximately 20% of the width of the base body 1. The same applies to the partial coupling joint or thin point 26' and the short lever arm 29'. If the spacing between the lever arm 27 and the projecting part 3 is included, a total space requirement of a width of around 85% of the width of the base body 1 results. Next to each of the support points 31 and 31' of the support elements 30 and 30', there thus remains a distance of around 7.5% of the width of the base body 1, respectively. Also, the projecting point 2 has the same width of around 85% of the width (horizontal graduation 2',3') of the base body 1. (In FIG. 1, for purposes of simplification, the projection part 2 is drawn just as wide as the base body 1 and the support element 30 and the support point 31 are shifted to the very edge.)

The base body 1 furthermore includes the penetrating vertical hole 8 into which the (not-depicted) permanent magnet is pushed from below. Four fastening tabs 7 serve as a stop and for attaching the permanent magnet with screws. Additionally, FIG. 2 indicates on the upper side of the long lever arm 28 of the third lever, a slit for an optical position sensor 41, which controls, via a regulating amplifier, the current through the coil 34 in known manner.

The hole 8 does not contact the edge of the housing-integral area 1 at any lateral surfaces. On the contrary, there continues to be a wall of at least 5 mm thickness. This gives the housing-integral area 1 great stability so that deformation remains minimal even if great forces in the guide are present (e.g. in case of off-center positions of the object to be weighed on the scale pan). The horizontal through-hole 9 through the housing-integral base body 1 should be as small as the manufacturing technology permits. In particular, at least 5 mm of material remains above the through-hole 9. Compared with an upwardly open trench for milling the lever arm 28, the stability of the housing-integral base body 1 is thereby significantly increased.

Furthermore, a step (break-out surface) 40 is shown at both the upper side and the lower side of the load receiver 10. The height of this step 40 is dimensioned such that the horizontal surface of the step 40 is situated precisely at the height of the neutral fiber of the thin points 15 and 17 of the upper guide 12 or at the height of the neutral fiber of the thin points 14 and 16 of the lower guide 11. At these horizontal surfaces, the scale pan or the tray is fastened to the load receiver 10 by means of a C-shaped intermediate part (not shown). As a result of this embodiment of the fastening of the scale pan/tray, the torque resulting from off-center loading of the scale pan is, as a pair of horizontal forces, directly introduced into the guides 11 and 12 and does not cause any torsion of the load receiver 10.

In FIGS. 2 and 3, the steps 40 at the load receiver 10 are drawn across the entire width of the load receiver 10. Naturally, it is also possible to provide these steps only at the points at which the scale pan/tray is actually fastened in order to weaken the load receiver 10 as little as possible.

Figure 4:
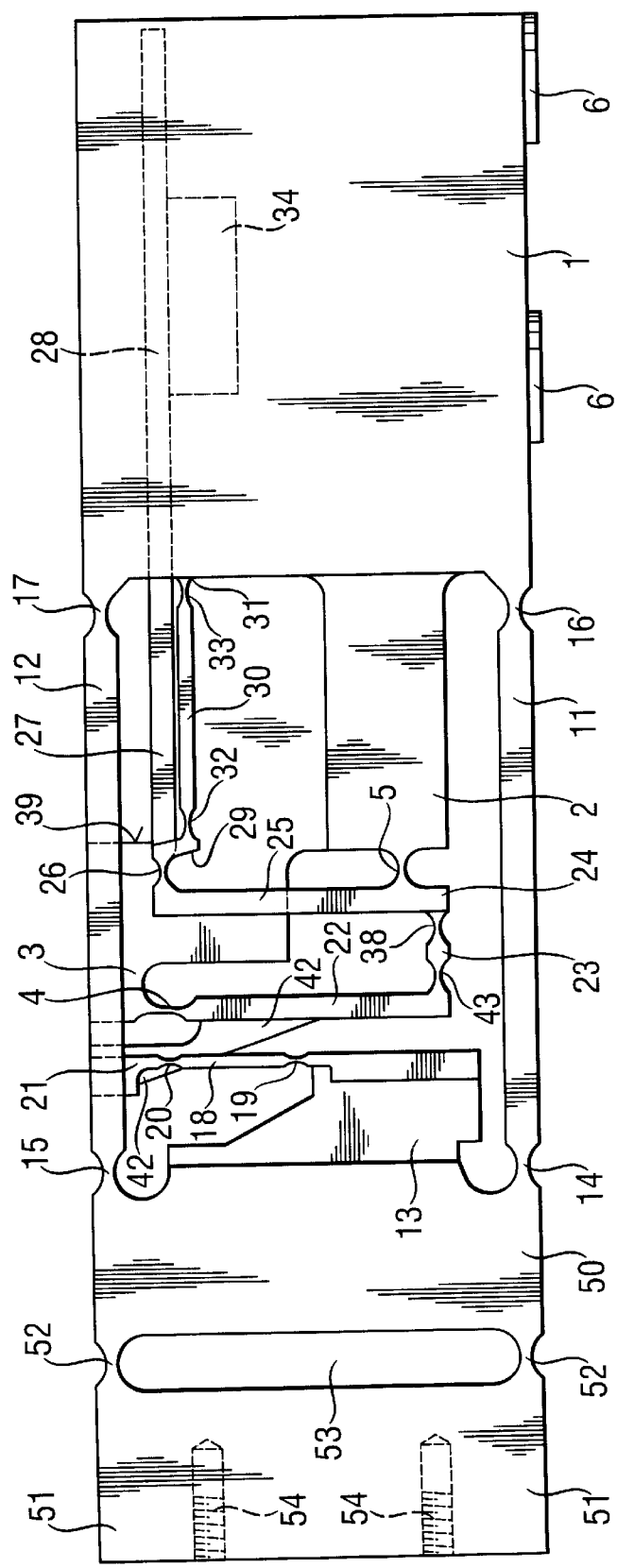
FIG. 4 shows a side view of the weight sensor in a second embodiment.

In FIG. 4, a second embodiment of the weight sensor according to the invention is depicted in side view. All parts of this second embodiment up to the load receiver are identical with the first embodiment which has already been described. Identical parts are designated with the same reference numerals and not described again. The load receiver of the second embodiment consists of a right part 50, at which the guides 11 and 12 engage, and a left part 51, at which the pan or the tray is fastened via two threaded holes 54. The right part 50 and the left part 51 are separated from each other by a vertical slot (recess) 53 which, both at its upper and its lower end, allows a connecting bridge (material bridge) 52 to remain. The connecting bridges 52 are situated precisely at the height of the thin point 15 and the thin point 14. In the event of an off-centered position of an object to be weighed, the connecting bridges 52 are so stable that they, in addition to the horizontal forces, also transfer, without significant bending, the vertical force of the object.

Also, in the event of an off-centered position of the object on the scale pan, the horizontal forces are, due to this construction, introduced into the right part 50 of the load receiver at the height of the guide 12. Thus, the danger of a bending of the right part 50 of the load receiver and, therefore, a change in the vertical distance of the articulation points 14 and 15 of the two guides 11, 12 is minimized.

This configuration is also fabricated from a single block of material, with the exception of the coil 34 and the permanent magnet.

The following embodiments with a calibration weight support according to FIGS. 5 through 11 are, except as noted otherwise, constructed in principle as the embodiments according to FIGS. 1 through 4.

In the side view of FIG. 5, the housing-integral base body 1 is shown, which has on its underside the flat pedestal area 6 to which the base body can be fastened with screws. The base body 1 extends to the left into the projection area 2 and the projecting area 3. The area 2 has a width of approximately two-thirds of the width of the base body 1. The area 3 is still narrower (approximately 40% of the base body 1). The base body 1 also includes the round hole 8 which receives the cylindrical permanent magnet (not depicted).

At the far left in FIG. 5, the load receiver 10 is depicted connected to the base body 1 via the upper guide 12 and the lower guide 11. The articulation point between the upper guide 12 and the load receiver 10 is designated with the reference numeral 15 and extends across the entire width of the guide or the load receiver. The articulation point between the lower guide 11 and the load receiver 10 is designated with the reference numeral 14 and likewise extends across the entire width of the guide or the load receiver. The articulation points between the guides 11 and 12 and the base body 1 are designated with the reference numerals 16 and 17, respectively. They also extend across the entire width. The upper guide 12 has a central recess into which the projecting part 3 projects. The upper terminating surface of the projecting part 3 is situated at the same height or level as the upper side of the guide 12 and can, therefore, not be seen in the side view. Only the vertical back side or graduation 39 of the projecting part 3 is partially visible in FIG. 5. The load receiver 10 is connected to the base body via the guides 11 and 12 with their articulation points. The load receiver can, however, move somewhat in vertical direction.

The force to be measured is transmitted from the load receiver 10, through the stable projection 13 and the coupling elements 18 having the articulation points 19 and 20, to the short lever arm 21 of the first lever. The long lever arm of the first lever is designated with the reference numeral 22. Also visible is the triangular reinforcement 42 between the short lever arm 21 and the long lever arm 22 of the first lever. The first lever 21/22 is borne by the bearing points 4 at the projecting part 3.

From the end of the long lever arm 22, the reduced force is transmitted through the articulation point 43 to the coupling element 23 and from there through the articulation points 38 to the short lever arm 24 of the second lever. The second lever 24/25 is borne by the bearing points 5 on the projecting part 2. The upper part of the long lever arm 25, 25' is divided in a fork-like manner. One part is situated on one side of the projecting part 3 (in FIG. 5 in front of the projecting part 3). The other part is situated on the other side of the projection part 3 (in FIG. 5 behind the projecting part 3 and thus not visible).

From there, the two forces are transmitted by the long lever arms 25, 25' of the second lever, through the two partial coupling joints 26, 26', to the two sides of the split short lever arm 29, 29' of the third lever 29, 29'/27, 27'/28. The third lever is borne at the base body 1 by the support elements 30, 30' having the articulation points 32, 32' and 33, 33'. The long lever arm 27, 27' of the third lever is split in its initial area and brought back together into one piece at its end. At this common, not-split part 28 of the long lever arm 27, 27', the coil 34 is fastened. The fork-like shafts of the long lever arm 27, 27' surround the projecting part 3 symmetrically. The support elements 30, 30' for the third lever are again laterally situated outside of the two shafts of the long lever arm 27, 27'.

Furthermore, the step 40 is visible on each of the upper side and the lower side of the load receiver 10. The height of this step is dimensioned such that the horizontal surface of the step 40 is at precisely the height of the neutral fiber of the thin points 15 and 17 of the upper guide 12 or at the height of the neutral fiber of the thin points 14 and 16 of the lower guide 11. At these horizontal surfaces the scale pan or tray is fastened to the weight sensor by means of a C-shaped intermediate part (not shown). Through this embodiment of the fastening of the scale pan/tray, the torque, which occurs in the event of off-center loading of the scale pan, is directly introduced as a horizontal pair of forces into the guides 11 and 12 and does not cause any torsion of the load receiver 10.

Figure 11:
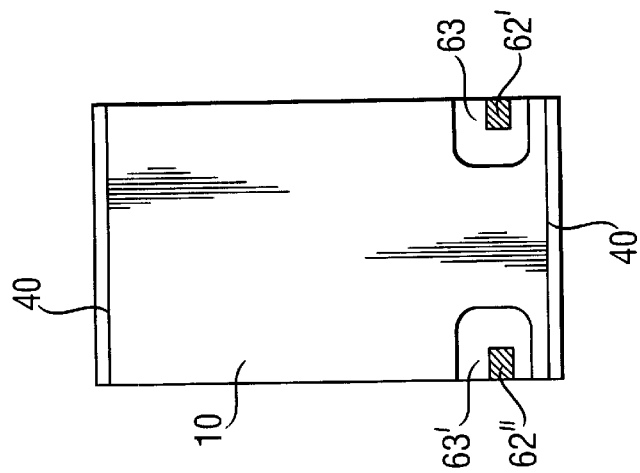
FIG. 11 shows a front view of the load receiver of FIG. 10.

To carry out a calibration/adjustment, the weight sensor according to FIGS. 5 and 11 is equipped with a pair of additional levers 44, 44' (see also FIG. 7) each of which is borne on a lateral projection 45 at the projecting area 3. The additional lever 44, 44' presses, through a pair of coupling elements 46, on the middle portion of the long lever arm 25, 25' of the second translating lever 24, 24'/25, 25'. The end of the additional lever 44, 44' has a depression 47 into which a calibration weight 49 can be deposited during calibration or adjustment. The device to raise and lower the calibration weight 49 is situated outside of the monolithic material block and, for the sake of clarity, not depicted in FIG. 5. Various constructions of this lift device are known and therefore not explained in detail. The lift device is schematically suggested in FIG. 7 at reference numerals 73, 73'.

The calibration weight 49 is cylindrical and extends through an opening 48 in the projection area 3 to the other side of the projecting area 3, which, in FIG. 5, is situated behind the plane of the drawing. Behind the plane of the drawing, there is also the identical additional lever 44' along with its bearing and a coupling element 46'. The calibration weight 49 therefore rests in the calibration position on the two additional levers 44, 44' shown in FIGS. 5 and 7. The force of the calibration weight is, through the two coupling elements 46/46', introduced as a horizontal force into the two long lever arms 25, 25' of the second translating lever 24, 24'/5, 25' where the force from the load receiver is already significantly reduced. As a result of this arrangement and as a result of the additional leverage of the additional lever 44, 44', a calibration weight of, for example, 300 g is sufficient to simulate a load of 50 kg on the load receiver. Therefore, the calibration weight 49 is so small and so light that the overall size and the weight of the weight sensor is not significantly increased by the calibration weight 49, even in the case of high nominal loads of the weight sensor.

The additional levers 44, 44', their bearing and the coupling elements 46/46' are monolithic components of the metal block, out of which the remaining portion of the weight sensor is also fabricated. Thus, the advantages of the monolithic construction such as great long-time constancy and low level of influence due to temperature are realized for the calibration weight support as well.

In the normal weighing setting (for weighing a load acting on the load receiver 10), the calibration weight 49 is raised by the not-depicted lift device which is arranged integrally with the housing. Also, the calibration weight 49 is pressed as a stop against the upper side of an opening 48 in the projecting area 3 (at the same time protection during transport). In this case, an active connection to the additional levers 44, 44' no longer exists.

A second embodiment of the weight sensor with a calibration weight according to the invention is shown in FIG. 6. Like parts as in the first embodiment according to FIG. 5 are designated with like reference numerals and are not explained again. This second embodiment includes, in addition to an additional lever 55, which is borne on a lateral projection 56 at the projecting area 2, an articulated lever system 57/58, which magnifies the vertical force acting at a thin point 65. The lever system 57/58 also introduces this force as a horizontal force at a thin point 66 into the long lever arm 25 of the second translating lever 24/25. Moreover, the articulating lever system 57/58 is borne at a thin point 67 at a projection 69 of the base body 1 and supported there. The calibration weight 49 extends, as in the first embodiment, through an opening 59 in the projecting area 2 to the back side of the plane of the drawing. Behind the plane of drawing on the back side of the projecting area 2, there is, in like manner, the additional lever 55' and the articulated lever system 57'/58' so that the force of the weight of the calibration weight 49 is again introduced as two partial forces into the two lever arms 25/25' of the second translating lever 24/25. The lift device for raising and lowering the calibration weight 49 is again, for the sake of clarity, not drawn in. The second embodiment functions in the same way as the first embodiment. Through the additional articulated lever arrangement, the calibration weight 49 can be configured even smaller and lighter for a given maximum load of the scale.

In both embodiments, the cylindrical calibration weight 49 is advantageously longer than the width of the monolithic block, so that the lift device (73/73' in FIG. 7) for the calibration weight can be mounted laterally on both sides on the fixed part, i.e. at the base body 1 of the monolithic block. The lift device can raise the calibration weight at projecting ends 79, 79'. Thus, the weighing cell including the calibration device and associated electronics can be employed as a module in scale housings or weighing systems. The weighing cell is preferably mounted together with the electronics on a mounting plate or a chassis. This module is, from the standpoint of measurement technology, balanced or equalized.

Figure 9:
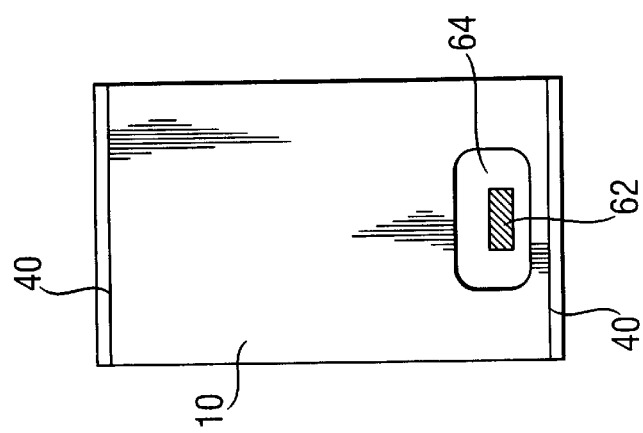
FIG. 9 shows a front view of the load receiver of FIG. 8.
Figure 7:
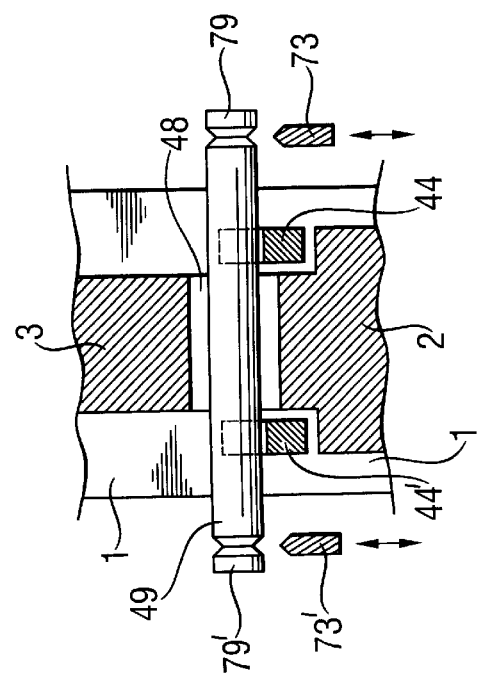
FIG. 7 shows a vertical section through a portion of the weight sensor along line 7—7 in FIG. 5.
Figure 8:
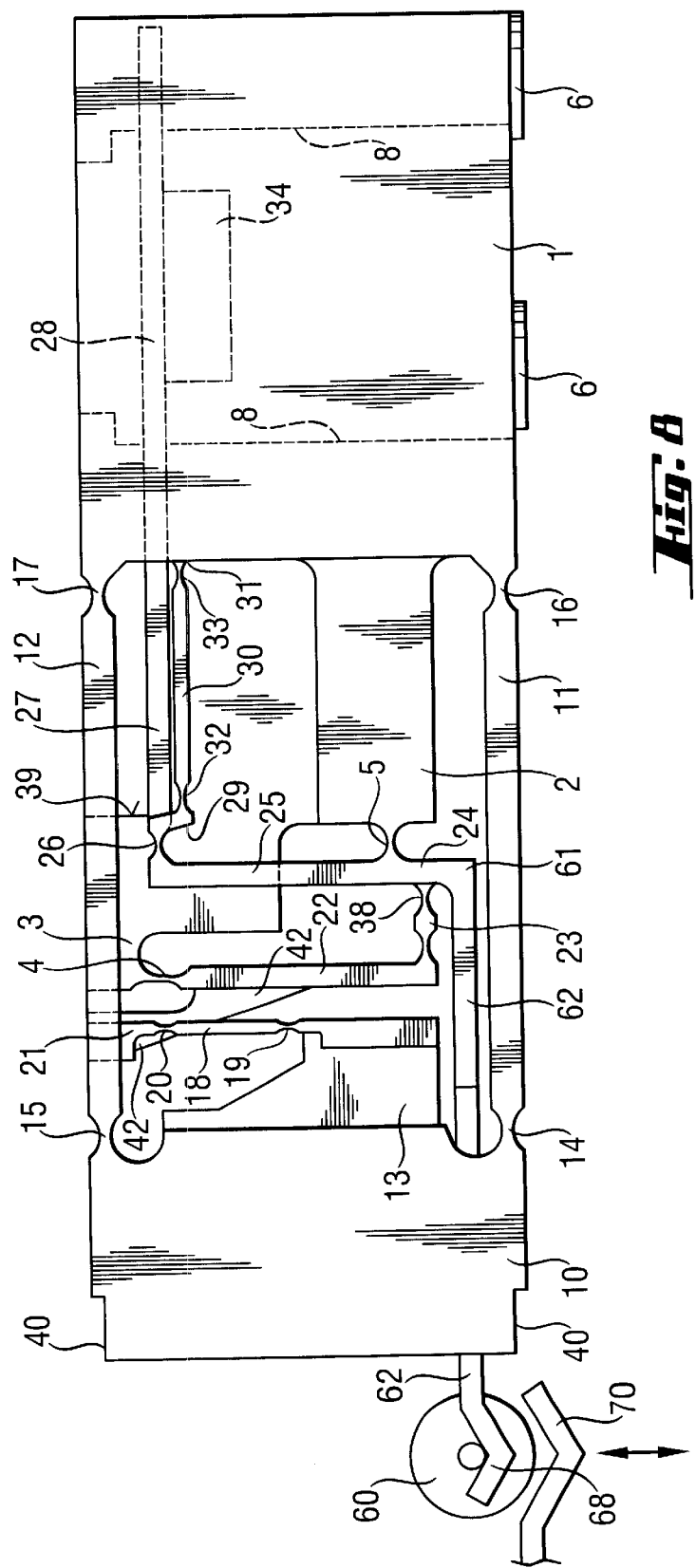
FIG. 8 shows a weight sensor with a calibration weight in side view in a third embodiment.

In FIGS. 8 and 9, a third embodiment of the weight sensor with a calibration weight according to the invention is shown. FIG. 8 is a side view, while FIG. 9 is a front view of the load receiver 10. Like parts as in the first two embodiments are designated with like reference numerals and not explained again. The weight sensor in FIGS. 8 and 9 has a short vertical extension 61 at the second translating lever 24/25,25' which transitions into a horizontal lever arm 62. This horizontal lever arm 62 passes through the load receiver 10, which has a rectangular recess 64 in its plane of symmetry. The recess 64 is visible in the front view of the load receiver 10 in FIG. 9. The horizontal lever 62 has a depression 68 at its (in FIG. 8 left) end, which serves as a receiver bearing into which a calibration weight 60 is deposited during calibration or adjustment. In FIG. 8, the calibration weight 60 is shown in this calibration position. The device to raise and lower the calibration weight is suggested through a receiver 70 which is vertically movable. Thus, in this embodiment, the translation lever 24/25,25', which is already present, is extended by the additional lever arm 61/62. Thereby, a support for the calibration weight 60 is created. The additional lever arm 61/62 is fabricated from the material block of the weight sensor and is, therefore, a monolithic component of the weight sensor.

A fourth embodiment of the weight sensor with a calibration weight according to the invention is shown in FIGS. 10 and 11. FIG. 10 is a side view, while FIG. 11 is a front view of the load receiver 10. Like parts as in the third embodiment according to FIGS. 8 and 9 are designated with like reference numerals and not explained again. In this fourth embodiment, the lever arm 62 for the calibration weight 60 is, in a fork-like manner, split in its middle part 62'/62". The one part 62' is situated in a groove 63 in the load receiver 10, which, in FIG. 10, is milled on the front side of the load receiver 10 (in FIG. 11, on the right side). The other part 62" is, in FIG. 10, situated on the right side of the load receiver 10. Therefore, it can be seen only in FIG. 11. The part 62" is situated in a groove 63' on the left side of the load receiver 10. In FIG. 10, in the area to the left of the load receiver 10, the two parts 62'/62" are, as the lever arm 62, preferably brought back together into a fork with a connecting bridge. The lever arm 62 bears the calibration weight 60 in its receiver 68. According to variations of the exemplary embodiments of FIGS. 8 and 10, the contour of the load receiver can be adapted to form a partial or complete recess sufficient to receive the end of the horizontal lever arm 62 and 62' with the receiver 68 for the calibration weight 60 as well as the receiver 70, or selected parts thereof.

Preferably, the fabrication of the monolithic portion of the weight sensor takes place through milling. As to the material, a metal with good elastic characteristics, such as an aluminum alloy, is preferably used. The structuring of the individual elements is also possible in part through wire erosion. Fabrication is also conceivable through die casting or injection molding (for example using a fiberglass-reinforced synthetic) in combination with other processing techniques.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A weight sensor, comprising:
   a base body having at least one projection;
   a load receiver; and
   a plurality of force transmission elements arranged between the load receiver and the base body,
   wherein at least one of the plurality of force transmission elements is divided to form partial force transmission elements that are symmetrically spaced from a central, vertical plane which passes through the load receiver,
   wherein at least one of the plurality of force transmission elements is arranged symmetrically in the central, vertical plane,
   wherein the projection of the base body has bearing points to bear at least one of the plurality of force transmission elements;
   and wherein the projection extends at least partially between the partial force transmission elements.

2. The weight sensor of claim 1, wherein the base body, the load receiver and the plurality of force transmission elements are machined from a single monolithic material block.

3. The weight sensor of claim 1, further comprising:
   a plurality of parallel guides between the base body and the load receiver to guide the load receiver; and
   a carrier for a coil, wherein the central, vertical plane additionally passes through the carrier for the coil.

4. The weight sensor of claim 3, wherein the base body, the load receiver, the plurality of parallel guides and the plurality of force transmission elements are machined from a single monolithic material block.

5. The weight sensor of claim 1, wherein the projection of the base body comprises at least one graduation in the central, vertical plane.

6. The weight sensor of claim 5, wherein the projection of the base body further comprises at least one graduation that is lateral with respect to the central, vertical plane.

7. The weight sensor of claim 1, wherein the plurality of force transmission elements further comprises at least one translating lever which is at least partially divided into two partial levers, wherein a first lever of the two partial levers is symmetrically arranged in the central, vertical plane, and wherein a second lever of the two partial levers is arranged on both sides of the projection of the base body.

8. The weight sensor of claim 1, wherein the plurality of force transmission elements comprises:
   a first translating lever forming an undivided angle lever;
   a straight second translating lever extending vertically and having a short lever arm and a long lever arm, wherein the long lever arm is divided, as a fork, into two partial levers; and
   a third translating lever forming an angle lever which is, as a fork, partially divided at a beginning of the angle lever and re-united into an end of the angle lever.

9. The weight sensor of claim 8, further comprising a plurality of parallel guides between the base body and the load receiver to guide the load receiver, wherein a width of the projection of the base body is less than a width of each of the plurality of parallel guides and wherein a width of each of the two partial levers and a width of at least one of the plurality of force transmission elements is sufficiently small so that neither the two partial levers nor the at least one of the plurality of force transmission elements project laterally beyond the plurality of parallel guides.

10. The weight sensor of claim 9, wherein a width of the projection of the base body comprises substantially 40% of a width of each of the plurality of parallel guides and wherein a width of each of the two partial levers and a width of at least one of the plurality of force transmission elements is in the range of 10% to 20% of the width of each of the plurality of parallel guides.

11. The weight sensor of claim 1, wherein the plurality of force transmission elements comprises:
    a first translating lever forming an undivided angle lever;
    a straight second translating lever extending vertically and having a short lever arm and a long lever arm, wherein the long lever arm is divided, as a fork, into two partial levers; and
    a third translating lever forming an angle lever, wherein the angle lever is horizontally and vertically bent at a right angle, partially divided as a fork and re-united into an end of the angle lever, and wherein the end of the angle lever comprises an integrated support bearing to support a coil and an optical position sensor.

12. The weight sensor of claim 1, wherein the base body comprises a vertical hole to receive a permanent magnet, and wherein the base body forms a material bridge having a width of at least 5 mm around the vertical hole.

13. The weight sensor of claim 8, wherein the base body further comprises a horizontal through hole into which a long arm of the third translating lever projects, and wherein the base body forms a material bridge having a width of at least 5 mm around the horizontal through hole.

14. The weight sensor of claim 3, wherein each of the plurality of parallel guides has the same width across the entire length of each of the plurality of parallel guides and wherein each of the plurality of parallel guides has a central cutout leaving material of a width of at least 5 mm on each side of the central cutout.

15. The weight sensor of claim 1, wherein the load receiver comprises a horizontal graduation on each of an upper side of the load receiver and an underside of the load receiver, wherein connection elements are mounted at the horizontal graduation to connect the load receiver with a balance pan, and wherein the horizontal graduation is arranged at a height of thin points of articulation points between the load receiver and the plurality of parallel guides.

16. The weight sensor of claim 15, wherein a width of the horizontal graduation is less than a width of each of the plurality of parallel guides.

17. The weight sensor of claim 1, wherein the load receiver comprises a cutout extending in a substantially vertical direction, the cutout dividing the load receiver into two parts and leaving a first horizontal material bridge above the cutout and a second horizontal material bridge below the cutout, the first and second material bridge being structured to form a connection between the two parts of the load receiver.

18. The weight sensor of claim 17, further comprising a plurality of parallel guides between the base body and the load receiver to guide the load receiver, wherein the plurality of parallel guides is structured to engage at one of the two parts of the load receiver, and wherein the first and the second material bridge are arranged at a height of thin points of articulation points between the load receiver and the plurality of parallel guides.

19. The weight sensor of claim 1, wherein at least one of the plurality of force transmission elements is structured to support a calibration weight, the at least one of the plurality of force transmission elements being a monolithic component of a material block.

20. The weight sensor of claim 19, wherein the at least one of the plurality of force transmission elements is a lever having a support directly supporting the calibration weight.

21. The weight sensor of claim 20, wherein the lever is divided into two partial levers.

22. The weight sensor of claim 20, wherein the lever engages at a translating lever.

23. The weight sensor of claim 19, wherein the calibration weight has a cylinder shape, and wherein the length along an axis of the calibration weight is greater than a width of the material block.

24. The weight sensor of claim 19, wherein one of the plurality of force transmission elements comprises a lever arm to support a calibration weight, and wherein the lever arm is a monolithic component of the material block.

25. The weight sensor of claim 19, wherein the calibration weight is arranged in an area between the load receiver and the base body, wherein the calibration weight passes, in an opening, transversely through the area, wherein the base body comprises a lift device which is structured to move the calibration weight between a calibration position in which the calibration weight engages with the plurality of force transmission elements and a deactivated position in which the calibration weight is disengaged from the plurality of force transmission elements.

26. The weight sensor of claim 25, wherein the calibration weight, in the deactivated position, is fastened in the opening of the base body.

27. A weight sensor, comprising:
    a base body having a projecting end;
    a load receiver;
    an upper guide and a lower guide connecting the base body with the load receiver;
    at least three translating levers to reduce a force exerted on the load receiver; and
    coupling elements arranged between the three translating levers and arranged between the load receiver and a first translating lever of the three translating levers,
    wherein the base body projects in the direction of the load receiver into the space between the upper and the lower guide,
    wherein the base body forms a support point substantially at the projecting end of the base body to support the first translating lever of the three translating levers,
    wherein at least one of the at least three translating levers is divided at least in part into partial levers, at least one of the coupling elements is divided into partial coupling elements, and the two partial levers and the two partial coupling elements are symmetrically arranged on both sides of the projecting end of the base body, wherein the projecting end of the base body extends at least partially between the partial levers; and wherein the at least three translating levers, the partial levers, the coupling elements and the partial coupling elements are monolithic components of a unitary metal block.

28. The weight sensor of claim 27, wherein at least one of the three translating levers has a long arm and a short arm, the weight sensor further comprising:

a coil fastened at the long lever arm of the at least one of the three translating levers and located in a magnetic field of a permanent magnet which is mounted to a housing of the weight sensor.

29. The weight sensor of claim 27, wherein one translating lever of the at least three translating levers comprises an extension downwardly extending past a coupling point of the at least one coupling element, and wherein the extension comprises a horizontal lever arm which passes through the load receiver and is configured to support a calibration weight.

30. The weight sensor of claim 29, wherein the horizontal lever arm is structured to centrally pass through the load receiver in a symmetry plane of the weight sensor.

31. The weight sensor of claim 29, wherein the horizontal lever arm divides as a fork into two symmetric prongs, the load receiver comprises two horizontal lateral grooves, and the two symmetric prongs extend respectively through the lateral grooves to thereby circumvent the load receiver.

* * * * *